United States Patent
Siomina et al.

(10) Patent No.: US 11,750,344 B2
(45) Date of Patent: Sep. 5, 2023

(54) CO-EXISTENCE BETWEEN POSITIONING BEAMS AND RADIO COMMUNICATION BEAMS

(71) Applicant: Telefonaktiebolaget LM Ericsson (publ), Stockholm (SE)

(72) Inventors: Iana Siomina, Täby (SE); Florent Munier, Västra Frölunda (SE); Ritesh Shreevastav, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 87 days.

(21) Appl. No.: 17/606,779

(22) PCT Filed: May 1, 2020

(86) PCT No.: PCT/EP2020/062216
§ 371 (c)(1),
(2) Date: Oct. 27, 2021

(87) PCT Pub. No.: WO2020/221930
PCT Pub. Date: Nov. 5, 2020

(65) Prior Publication Data
US 2022/0209912 A1    Jun. 30, 2022

Related U.S. Application Data

(60) Provisional application No. 62/842,126, filed on May 2, 2019.

(51) Int. Cl.
*H04L 5/00* (2006.01)
*H04W 64/00* (2009.01)

(52) U.S. Cl.
CPC .......... *H04L 5/0048* (2013.01); *H04L 5/0023* (2013.01); *H04W 64/006* (2013.01)

(58) Field of Classification Search
CPC ... H04L 5/0048; H04L 5/0023; H04L 5/0094; H04W 64/006; H04B 7/088
See application file for complete search history.

(56) References Cited

U.S. PATENT DOCUMENTS 10,349,371 B2 *   7/2019   Park .................. H04W 64/00
10,779,126 B2 *   9/2020   Kumar ............ H04W 72/0446
(Continued)

OTHER PUBLICATIONS

3GPP, "3GPP TS 23.501 V16.0.2", 3rd Generation Partnership Project; Technical Specification Group Services and System Aspects; System Architecture for the 5G System; Stage 2 (Release 16), Apr. 2019, 1-317.
(Continued)

*Primary Examiner* — Kabir A Timory
(74) *Attorney, Agent, or Firm* — Murphy, Bilak & Homiller, PLLC

(57) ABSTRACT

A method, performed by a user equipment (UE), of associating positioning signals with beams transmitted in a wireless network, the method comprising: receiving, from the wireless network, information identifying at least one relationship between one or more positioning beams for transmitting positioning signals, and one or more radio resource management (RRM) beams for transmitting RRM signals; and receiving the positioning signals through the one or more positioning beams from the relationship between the one or more positioning beams and the one or more RRM beams.

24 Claims, 8 Drawing Sheets

(56) References Cited

U.S. PATENT DOCUMENTS

2018/0139586 A1 5/2018 Park et al.
2019/0044677 A1 2/2019 Ly

OTHER PUBLICATIONS

3GPP, "3GPP TS 29.172 V14.2.0", 3rd Generation Partnership Project; Technical Specification Group Core Network and Terminals; Location Services (LCS); Evolved Packet Core (EPC) LCS Protocol (ELP) between the (GMLC) and (MME) (Release 14), Mar. 2018, 1-43.

3GPP, "3GPP TS 33.401 V15.7.0", 3rd Generation Partnership Project; Technical Specification Group Services and System Aspects; 3GPP System Architecture Evolution (SAE); Security architecture (Release 15), Mar. 2019, 1-163.

3GPP, "3GPP TS 29.171 V15.2.0", 3rd Generation Partnership Project; Technical Specification Group Core Network and Terminals; Location Services (LCS); LCS Application Protocol (LCS-AP) between the Mobile Management Entity (MME) and Evolved Serving Mobile Location Centre (E-SMLC); SLs interface (Release 15), Mar. 2019, 1-62.

3GPP, "3GPP TS 36.305 V15.3.0", 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 15), Mar. 2019, 1-91.

3GPP, "3GPP TS 36.355 V15.3.0", 3rd Generation Partnership Project; Technical Specification Group Radio Access Network; Evolved Universal Terrestrial Radio Access (E-UTRA); LTE Positioning Protocol (LPP) (Release 15), Mar. 2019, 1-223.

3GPP, "3GPP TS 36.455 V15.2.1", 3rd Generation Partnership Project; Technical Specification Group Radio Access Network; Evolved Universal Terrestrial Radio Access (E-UTRA); LTE Positioning Protocol A (LPPa) (Release 15), Jan. 2019, 1-84.

3GPP, "3rd Generation Partnership Project; Technical Specification Group Radio Access Network; Evolved Universal Terrestrial Radio Access (E-UTRA); Physical channels and modulation (Release 15)", 3GPP TS 36.211 V15.5.0, Mar. 2019, 1-238.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.5.1, Apr. 2019, 1-948.

* cited by examiner

CO-EXISTENCE BETWEEN POSITIONING BEAMS AND RADIO COMMUNICATION BEAMS

TECHNICAL FIELD

The present invention generally relates to wireless communication networks, and particularly relates to the relationship between positioning beams and radio communication beams.

BACKGROUND

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

Positioning has been an important feature in LTE. In the LTE positioning architecture, a positioning node (referred to as E-SMLC or location server) configures the target device (e.g. UE), an eNB, or a radio node dedicated for positioning measurements (e.g., location measurement unit, LMU) to perform one or more positioning measurements depending upon the positioning method. The positioning measurements are used by the target device, by a measuring node, or by the positioning node to determine the location of the target device.

FIG. 1 is a block diagram illustrating a high-level architecture for supporting UE positioning in LTE networks. In this architecture, direct interactions between a UE and the E-SMLC occur via the LTE Positioning Protocol (LPP), as specified in 3GPP TS 36.355. Interactions between the E-SMLC and the eNodeB occur via the LPPa protocol (as specified in 3GPP TS 36.455), to some extent supported by interactions between the eNodeB and the UE via the Radio Resource Control (RRC) protocol (as specified in 3GPP TS 36.331). The LCS-AP protocol (as specified in 3GPP TS 29.171) supports interactions between E-SMLC and MME, and the SLg protocol (as specified in 3GPP TS 29.172) supports interactions between MME and the Gateway Mobile Location Center (GMLC). The following positioning techniques are supported in LTE, as specified in 3GPP TS 36.305:

- Enhanced Cell ID. Utilizes information to associate the UE with the geographical area of a serving cell, and then additional information to determine a finer granularity position.
- Assisted GNSS. The UE receives and measures Global Navigation Satellite System (GNSS) signals, supported by assistance information provided to the UE from E-SMLC. Two subcategories are UE-based (in which the UE calculates its own position) and UE-assisted (in which E-SMLC calculates the UE's position).
- OTDOA (Observed Time Difference of Arrival). The UE estimates the time difference of reference signals transmitted by different base stations (also refereed to as "reference signal time difference" or "RSTD") and sends to the E-SMLC for multilateration.
- UTDOA (Uplink TDOA). The UE is requested to transmit a specific waveform that is detected by multiple location measurement units (e.g. an eNB) at known positions. These measurements are forwarded to E-SMLC for multilateration.

FIG. 2 shows a more detailed network diagram of the LTE positioning architecture. Three important elements in this architecture are the LCS Client, the LCS target and the LCS Server. LCS Targets are entities being positioned, e.g., a user equipment (UE). An LCS Client is a software and/or hardware entity that interacts with an LCS Server for the purpose of obtaining location information for one or more LCS targets. LCS Clients can also reside in the LCS targets themselves. For example, a UE can include an LCS Client requesting self-positioning. Other nodes in the 3GPP network (e.g., RAN nodes) can include LCS Clients that can request the LCS Server to position LCS Targets operating in the 3GPP network. LCS Clients can also be external to the 3GPP network, such as illustrated in FIG. 2.

The LCS Server is a physical or logical entity managing positioning for an LCS target by collecting measurements and other location information, assisting the terminal in measurements when necessary, and estimating the LCS target location. An LCS Client sends a request to the LCS Server to obtain location information for one or more LCS Targets, and the LCS Server manages the received requests and sends the requested result(s)—and optionally a velocity estimate—to the LCS Client.

Example LCS Servers shown in FIG. 2 include E-SMLC/GMLC and a secure user-plane location platform (SLP). The GMLC interacts with LCS Clients external to the 3GPP network, on behalf of the E-SMLC. Alternately, external LCS Clients can interact directly with the UE via the SLP using the secure user plane location (SUPL) protocol.

Cell-specific reference signals were specified for UE RSTD measurements in 3GPP Rel-8. These reference signals were determined to be insufficient for OTDOA positioning, so Positioning Reference Signals (PRS) were introduced in Rel-9. PRS are pseudo-random, quadrature phase-shift keyed (QPSK) sequences that are mapped in diagonal patterns with shifts in frequency and time, thereby avoiding collision with cell-specific reference signals and an overlap with the control channels (PDCCH).

In general, cell-specific reference signals are unable to provide the required high probability of detection needed for OTDOA measurements. More specifically, the primary/secondary synchronization signals and reference signals for a neighbor cell are detectable when the Signal-to-Interference-and-Noise Ratio (SINR) is at least −6 dB. However, simulations have shown that this condition can be only guaranteed ~70% of the time for the third-best-detected cell (i.e., second-best neighboring cell), even in an interference-free environment that is unlikely in real-world scenarios. Being able to measure only a single RSTD (e.g., between serving and single neighbor cells) is insufficient for OTDOA positioning.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher. In contrast, URLLC requires low latency and high reliability but with less strict data rate requirements.

To support increased traffic capacity and to enable the transmission bandwidth needed to support very high data rate services, 5G/NR will extend the range of frequencies used for mobile communication. This includes new spectrum below 6 GHz (referred to as "FR1"), as well as spectrum in higher frequency bands above 24 GHz (referred to as "FR2"). High frequency bands provide contiguous larger bandwidth for higher rates in data communication. In such high frequency bands, however, the radio links are susceptible to rapid channel variations and suffer from severe pathloss and atmospheric absorption. To address these challenges, NR base stations and UEs will use often highly directional antennas for beamforming to achieve sufficient link budget in a wide area network.

However, the use of antenna arrays in NR base stations and UEs can create various issues, problems, and/or difficulties in relation to UE measurements based on PRS.

SUMMARY

Exemplary embodiments disclosed herein address these problems, issues, and/or drawbacks of existing solutions by providing a flexible but efficient approach for associating positioning beams and/or signals with beams and/or signals used for other purposes, such as radio resource management (RRM) and data communication. As such, exemplary embodiments of the present disclosure can facilitate solutions to overcome the exemplary problems described above Exemplary embodiments of the present disclosure include methods and/or procedures for associating positioning signals with beams transmitted in the wireless network. The exemplary methods and/or procedures can be implemented, for example, in a network node (e.g., eNB, gNB, E-SMLC, location management function (LMF), etc. or a component thereof).

In some embodiments, the exemplary method and/or can include determining a need for the one or more positioning beams to carry positioning signals to one or more UEs. In some embodiments, this can include receiving a request to determine the positions of the one or more UEs. Such a request can be received, for example, from the UE, another node in the network, or an entity (e.g., application) outside of the network via a gateway function (e.g., GMLC, LMF, etc.).

In some embodiments, the exemplary methods and/or procedures can also include determining a need for one or more positioning beams to carry the positioning signals to the one or more UEs. In some embodiments, this can include receiving a request to transmit the positioning beams from another node in the wireless network. Such a request can be received, for example, from a UE, a node in a radio access network (e.g., NG-RAN node such as gNB), or a node/function in a core network (CN, e.g., 5GC function such as LMF).

In some embodiments, the exemplary methods and/or procedures can also include determining at least one relationship between the positioning beams and one or more radio resource management (RRM) beams for transmitting RRM signals to the UEs. In some embodiments, the at least one relationship can include coverage of the positioning beams relative to the RRM beams. In some embodiments, the at least one relationship can include a relationship between the positioning signals and one or more RRM signals carried by the RRM beams. In some embodiments, the at least one relationship can include a quasi-colocation (QCL) relationship between the positioning signals and the RRM signals. In some embodiments, the one or more RRM signals can include respective synchronization signal and PBCCH blocks (SSBs).

The exemplary methods and/or procedures can also include sending, to one or more other nodes in the wireless network, information identifying the at least one relationship between the positioning beams and the RRM beams. In some embodiments, the network node can be a base station (e.g., eNB, gNB, etc., or component thereof), and the one or more other nodes can include at least one of the following: the one or more UEs, and a location server (e.g., E-SMLC, LMF, etc.). In other embodiments, the network node can be a location server and the one or more other nodes can include at least one of the following: the one or more UEs, and one or more base stations.

In some embodiments, the exemplary methods and/or procedures can also include transmitting the positioning signals and the RRM signals based on the at least one relationship between the positioning beams and the RRM beams.

Other exemplary embodiments of the present disclosure include further methods and/or procedures for associating positioning signals with beams transmitted in a wireless network, according to various exemplary embodiments of the present disclosure. The exemplary methods and/or procedures can be implemented by a user equipment (UE, e.g., wireless device, IoT device, etc. or component thereof).

In some embodiments, the exemplary methods and/or procedures can include receiving, from the wireless network, a configuration of positioning signals to be transmitted by the wireless network. For example, the configuration can be received as assistance data from the wireless network (e.g., from the LMF). The configuration can include various information defining PRS, as well as information identifying particular cells (e.g., serving and neighbor cells) that will be transmitting the PRS.

The exemplary methods and/or procedures can include receiving, from the wireless network, information identifying at least one relationship between: one or more positioning beams for transmitting the positioning signals, and one or more RRM beams for transmitting RRM signals. In some embodiments, the at least one relationship can include coverage of the positioning beams relative to the RRM beams. In some embodiments, the at least one relationship can include a relationship between the positioning signals and one or more RRM signals carried by the RRM beams. In some embodiments, the at least one relationship can include a QCL relationship between the positioning signals and the RRM signals. In some embodiments, the one or more RRM signals can include respective SSBs.

In some embodiments, the exemplary methods and/or procedures can also include, based on the received configuration and on the received at least one relationship, determining one or more positioning beams for receiving the positioning signals. In some embodiments, the exemplary methods and/or procedures can also include receiving the positioning signals via the determined positioning beams.

Other exemplary embodiments include network nodes (e.g., eNB, gNB, E-SMLC, LMF, etc. or a component thereof) and user equipment (UE, e.g., wireless device, IoT device, etc. or component thereof) configured to perform operations corresponding to the exemplary methods and/or procedures described herein. Other exemplary embodiments include non-transitory, computer-readable media storing program instructions that, when executed by at least one processor, configure such network nodes or UEs to perform operations corresponding to the exemplary methods and/or procedures described herein.

These and other objects, features and advantages of the exemplary embodiments of the present disclosure will become apparent upon reading the following detailed description of the exemplary embodiments of the present disclosure.

DETAILED DESCRIPTION

Figure 1:
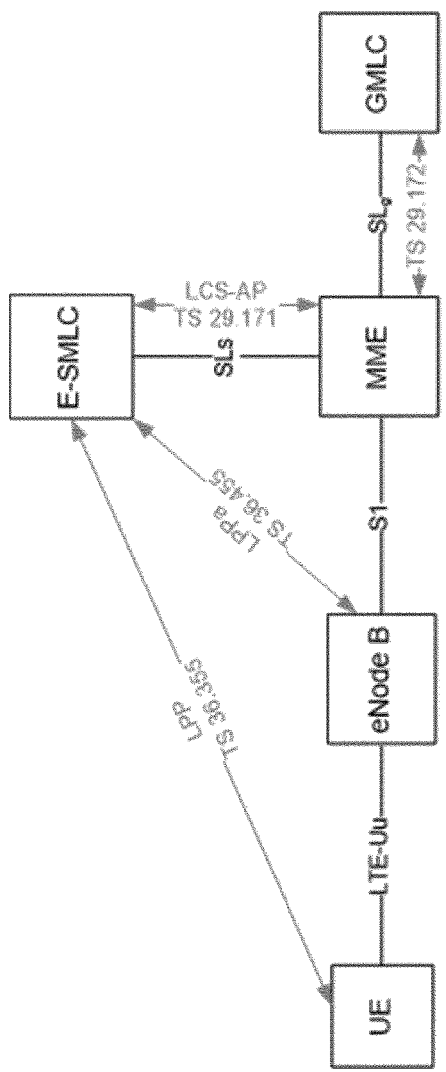
FIG. 1 illustrates a high-level architecture for supporting UE positioning in LTE networks.
Figure 2:
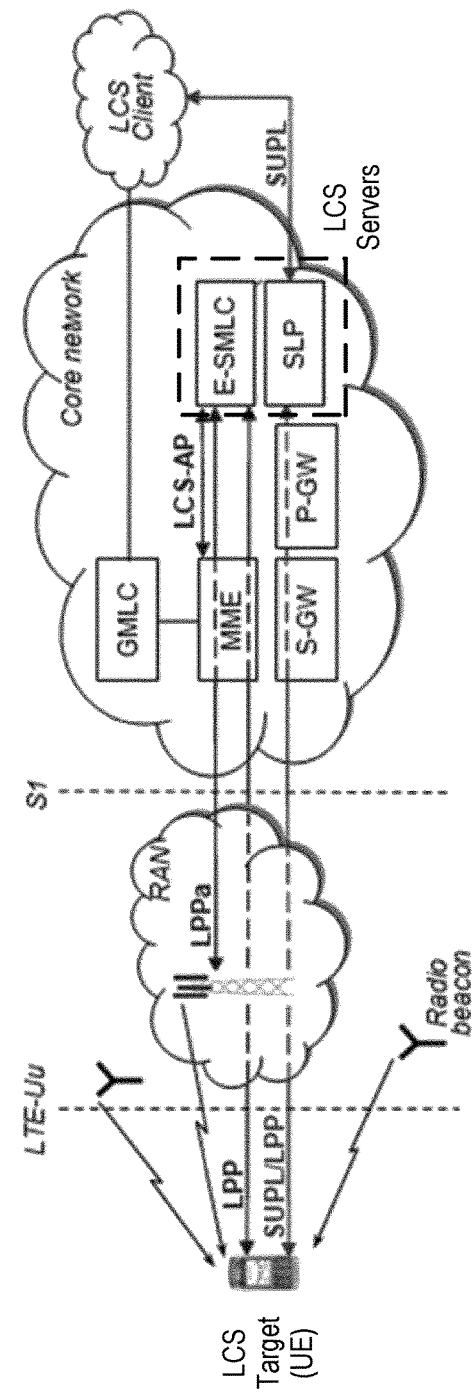
FIG. 2 shows a more detailed network diagram of an LTE positioning architecture.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As used herein, a "radio node" can be either a "radio access node" or a "wireless device." A "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), and a relay node.

A "core network node" may be used herein to refer to any type of node in a core network. Some examples of a core network node include, e.g., a Mobility Management Entity (MME), a Packet Data Network Gateway (P-GW), a Service Capability Exposure Function (SCEF), or the like.

A "wireless device" may be used herein to refer to any type of device that has access to (i.e., is served by) a cellular communications network by wirelessly transmitting and/or receiving signals to a radio access node(s). Some examples of a wireless device include, but are not limited to, a UE in a 3GPP network and a Machine Type Communication (MTC) device.

A "network node" may be used herein to refer any node that is either part of the radio access network or the core network of a cellular communications network/system.

A "base station" may comprise a physical or a logical node transmitting or controlling the transmission of radio signals, e.g., base station, gNB, ng-eNB, transmitting radio network node, TRP, RRH, RRU, DAS (Distributed Antenna System), relay, etc.

The term "positioning signals" may be used herein to include PRS, CSI-RS, or other reference signals or channels intended for positioning measurements.

As used herein, "positioning measurements" may include timing measurements (e.g., time difference of arrival, TDOA, RSTD, time of arrival, TOA, Rx-Tx, RTT, etc.), power-based measurements (e.g., RSRP, RSRQ, SINR, etc.), and/or identifier detection/measurement (e.g., cell ID, beam ID, etc.) that are configured for a positioning method (e.g., OTDOA, E-CID, etc.). UE positioning measurements may be reported to a network node or may be used for positioning purposes by the UE.

A "positioning beam" may be used herein to include any beam carrying at least one positioning signal. A positioning beam can have its own explicit identity or can be identified through an index associated with a specific signal that the beam carries.

An "RRM beam" may be used herein to include any beam carrying at least one signal/channel or signal block indented for RRM measurements (e.g., SSB, CSI-RS, DM-RS, PBCH, CORESET, etc.). An RRM beam can have its own explicit identity or can be identified through an index associated with a specific signal that the beam carries. "RRM measurements" can be used herein to include mobility measurements, cell identification, cell detection, SS-RSRP, SS-RSRQ, SS-SINR, CSI-RS based RSRP, CSI-RS based RSRQ, CSI-RS based SINR, L1 RSRP measurement, measurements for beam management (e.g., beam failure detection or beam recovery), RLM, MDT measurements, SON measurements, etc.

The above definitions are not meant to be exclusive. In other words, various ones of the above terms may be explained and/or described elsewhere in the present disclosure using the same or similar terminology.

As briefly mentioned above, the use of antenna arrays in NR base stations and UEs can create various issues, problems, and/or difficulties in relation to UE reference signal time difference (RSTD) measurements based on positioning reference signals (PRS). These issues are discussed in more detail below.

Multi-antenna technology can be used to improve various aspects of a communication system, including system capacity (e.g., more users per unit bandwidth per unit area), coverage (e.g., larger area for given bandwidth and number of users), and increased per-user data rate (e.g., in a given bandwidth and area). Directional antennas can also ensure better wireless links as a mobile or fixed device experiences a time-varying channel.

The availability of multiple antennas at the transmitter and/or the receiver can be utilized in different ways to achieve different goals. For example, multiple antennas can provide diversity gain against radio channel fading. To achieve diversity gain, the channels experienced by the different antennas should have low mutual correlation, e.g., a sufficiently large antenna spacing ("spatial diversity") and/or different polarization directions ("polarization diversity"). The most common multi-antenna configuration has been at the receiver side, which is commonly referred to as "receive diversity." Alternately and/or in addition, multiple antennas can be used in the transmitter to achieve transmit diversity. A multi-antenna transmitter can achieve diversity even without any knowledge of the channels between the transmitter and the receiver, so long as there is low mutual correlation between the channels of the different transmit antennas.

In other exemplary configurations, multiple antennas at the transmitter and/or the receiver can be used to shape or "form" the overall antenna beam (e.g., transmit and/or receive beam, respectively) in a certain way, with the general goal being to improve the received signal-to-interference-plus-noise ratio (SINR) and, ultimately, system capacity and/or coverage. This can be done, for example, by maximizing the overall antenna gain in the direction of the target receiver or transmitter or by suppressing specific dominant interfering signals. In general, beamforming can increase the signal strength at the receiver in proportion to the number of transmit antennas. Beamforming can be based either on high or low fading correlation between the antennas. High mutual antenna correlation can typically result from a small distance between antennas in an array. In such exemplary conditions, beamforming can boost the received signal strength but does not provide any diversity gains against radio-channel fading. On the other hand, low mutual antenna correlation typically can result from either a sufficiently large inter-antenna spacing or different polarization directions in the array. If some knowledge of the downlink channels of the different transmit antennas (e.g., the relative channel phases) is available at the transmitter, multiple transmit antennas with low mutual correlation can provide diversity gains and also shape the antenna beam in the direction of the target receiver and/or transmitter.

In other configurations, multiple antennas at both the transmitter and the receiver can further improve the SINR and/or achieve an additional diversity against fading compared to only multiple receive antennas or multiple transmit antennas. This can be useful in relatively poor channels that are limited, for example, by interference and/or noise (e.g., high user load or near cell edge). In relatively good channel conditions, however, the capacity of the channel becomes saturated such that further improving the SINR provides limited increases in capacity. In such cases, using multiple antennas at both the transmitter and the receiver can be used to create multiple parallel communication "channels" over the radio interface. This can facilitate a highly efficient utilization of both the available transmit power and the available bandwidth resulting in, e.g., very high data rates within a limited bandwidth without a disproportionate degradation in coverage. For example, under certain exemplary conditions, the channel capacity can increase linearly with the number of antennas and avoid saturation in the data capacity and/or rates. These techniques are commonly referred to as "spatial multiplexing" or multiple-input, multiple-output (MIMO) antenna processing.

Briefly, MIMO operation can be described mathematically as follows. A symbol vector s carrying r information symbols is multiplied by an $N_T \times r$ precoder matrix W, which serves to distribute the transmit energy in a subspace of the $N_T$-dimensional vector space, corresponding to $N_T$ antenna elements. Each of the r symbols in s corresponds to a "layer," and r is referred to as the transmission "rank." In this way, spatial multiplexing is achieved since multiple symbols can be transmitted simultaneously over the same resource element (RE). The number of symbols r is typically adapted to suit the current channel properties. To correctly receive an r-layer ("full rank") signal, a receiver must use at least r independent antenna elements.

Single-user MIMO (SU-MIMO) involves spatially multiplexing two or more layers to a single UE. Alternately, multi-user MIMO (MU-MIMO) involves spatially multiplexing two or more layers to two or more UEs, with each UE receiving one or more layers. In either case, however, a base station transmitter must employ some type of MIMO precoding to be able to utilize its antenna arrays to achieve these performance gains. The base station can derive the precoder matrix W based on knowledge of the channel from each transmit antenna to each UE receive antenna.

For example, this can be done by the receiver (e.g., UE) measuring the amplitude and phase of a known reference signal and sending these measurements to the transmitter (e.g., base station) as "channel state information" (CSI). The known reference signals used to estimate CSI are transmitted in association with the spatially multiplexed data. As such, RS measurements provide an accurate assessment of the channel used to transmit the spatially multiplexed data symbols.

CSI can include, for example, amplitude and/or phase of the channel at one or more frequencies, amplitude and/or phase of time-domain multipath components of the signal via the channel, direction of arrival of multipath components of the signal via the channel, and other direct channel measurements known by persons of ordinary skill. Alternately, or in addition, CSI can include a set of transmission parameters recommended for the channel based on one or more channel measurements.

Figure 3:
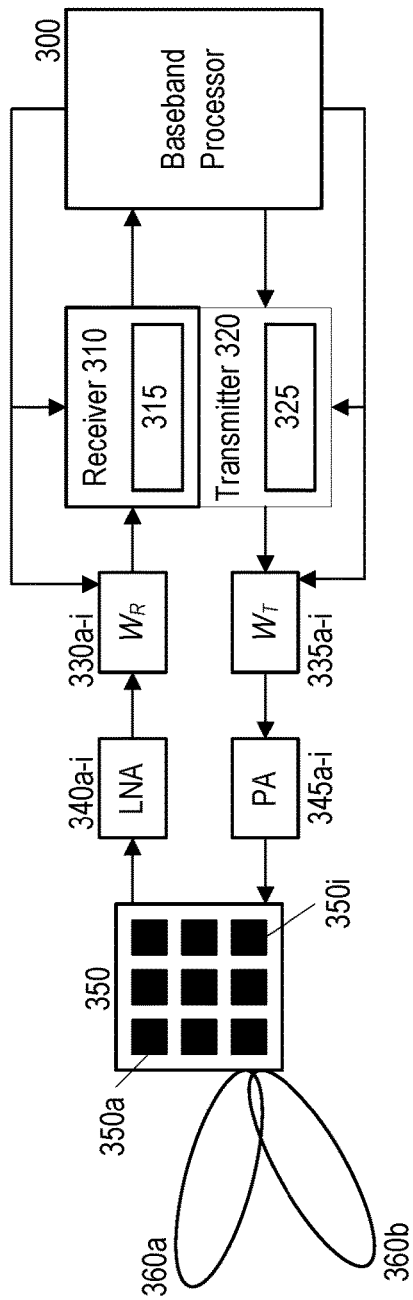
FIG. 3 shows a block diagram of an exemplary multi-antenna transceiver apparatus and/or device according to various exemplary embodiments of the present disclosure.

FIG. 3 shows a block diagram of an exemplary multi-antenna transceiver apparatus and/or device according to various exemplary embodiments of the present disclosure. For example, the exemplary transceiver apparatus can be a component of a UE or wireless device, including those described below in relation to other figures. In such an exemplary application, the transceiver apparatus shown in FIG. 3 can provide beamforming, diversity gains, and spatial multiplexing in the manner described above.

The exemplary apparatus shown in FIG. 3 can also include, e.g., an antenna array 350 that can comprise a plurality of individual antenna elements arranged in a particular pattern, such as, e.g., exemplary antenna elements 350a to 350i arranged in an exemplary 3-by-3 grid. In some exemplary embodiments, the antenna array 350 can be arranged as an M-by-N array of elements, where M≥1 and N>1. In some exemplary embodiments, the antenna elements 350a to 350i can be arranged in a rectangular grid with equal spacing in one or both dimensions; however, other exemplary arrangements of the elements comprising the array are possible and are within the scope of the present disclosure, including non-grid and/or irregular arrangements. In addition, each element of the antenna array 350 can have various physical forms including dipole, patch, cross dipole, inverted F, inverted L, helix, Yagi, rhombic, lens, and/or any another type of antenna topology known to persons of ordinary skill.

Elements 350a to 350i can utilize various polarization patterns known to persons of ordinary skill, including horizontal, vertical, circular, and cross polarization. For example, elements 350a to 350i—as well as their arrangement in the array 350—can be designed and/or configured especially for the particular operating frequency (e.g., 5 GHz, 10 GHz, 300 GHz, etc.) and device (e.g., mobile or fixed-location terminal, cellular phone, handset, laptop, tablet, etc.) in which the exemplary apparatus of FIG. 3 can be used.

According to certain exemplary embodiments of the present disclosure, the antenna elements 350a to 350i can be used for receiving and/or transmitting signals in combination with, respectively, other receiving and transmitting circuitry comprising the exemplary apparatus. The receiving circuitry can comprise a plurality of low-noise amplifiers (LNAs) 340a through 340i, each of which can amplify a signal received from a corresponding antenna element 350a through 350i. The exemplary apparatus can further comprise a plurality of receive gain/phase controls 330a through 330i, each of which can receive a signal output from a corresponding (LNAs) 340a through 340i. In some exemplary embodiments, the receive gain/phase control 330 can comprise a receiver beamformer that can be controlled by, e.g., one or more processors 300. The outputs of the receive gain/phase controls 330a through 330i are provided to a receiver block 310, which can comprise a receive conversion circuit 315. The inputs to block 310 can be at a particular radio frequency (RF), in which case block 310 can comprise circuitry configurable to translate the signals to an intermediate frequency (IF). Nevertheless, the skilled person can readily comprehend that RF-to-IF conversion can alternately occur prior to the signals reaching receiver block 310. As indicated herein, references to "processor" should be understood to mean one or more processors, including one or more computer processors, signal processors, etc.

Receive conversion circuit 315 can also include one or more analog-to-digital converters (ADCs) that sample the input signals, e.g., at IF. As such, the output of circuit 315 can comprise one or more streams of digitized samples that are provided to a baseband processor 300, which can provide one or more receiver control signals for controlling various operational aspects of, e.g., receive gain/phase controls 330a through 330i, receive conversion circuit 315, etc.

Similarly, processor 300 can provide one or more streams of digitized samples to transmitter block 320, which can comprise a transmit conversion block 325 as well as one or more digital-to-analog converters (DACs). The output of block 320 (e.g., the output of transmit conversion block 325) can comprise a plurality of analog signals, each of which can be at RF or IF, as described above for the receiving circuitry. Each of the analog signals output by transmitter block 320 can be applied to a corresponding transmit gain/phase control 335a through 335i. Processor 300 can also provide one or more transmitter control signals for controlling various operational aspects of, e.g., transmit gain/phase controls 335a through 335i, transmit conversion block 325, etc. In some exemplary embodiments, transmit gain/phase control 335 can comprise a transmit beamformer that can be controlled by, e.g., processor 300. Each of the signals output by transmit gain/phase control 335a through 335i can be applied to a corresponding transmit power amplifier (PA) 345a through 345i. The amplified outputs of the PAs can be applied to respective corresponding antenna array elements 350a through 350i.

In some embodiments, processor 300 can utilize a direction-of-arrival estimate or other available information to determine appropriate weights (e.g., $W_R$ or $W_T$) to cause the antenna array 350 to produce one or more beam patterns directed to a particular angular direction relative to the antenna array. For example, as shown in FIG. 3, by applying the appropriate weights (e.g., $W_R$ or $W_T$) to the signals received from the antenna elements 350a through 350i, the antenna array 350 can capture signals and/or multipath components that are incident in the directions of arrival corresponding to beams 360a and 360b while rejecting signals and/or multipath components that are incident other directions of arrival. In other exemplary embodiments, the weights can comprise and/or incorporate a precoder matrix that facilitates directing one or more beams directed to particular angular directions, e.g., for a beam sweep or to another device (e.g., base station) located at a specific position.

Processor 300 can program and/or configure receive gain/phase controls 330 and/or transmit gain/phase controls 335 with weights (e.g., $W_R$ or $W_T$, respectively) corresponding to the desired angular direction. Processor 300 can determine weights using various beam-steering or beam-forming algorithms know to persons of ordinary skill, including parametric algorithms and codebook-based algorithms. According to various exemplary embodiments, receive gain/phase controls 330 and/or transmit gain/phase controls 335 can comprise one or more programmable amplifiers that modifies the amplitude and/or phase of the signals (e.g., at RF or IF) from the array elements 350a through 350i. When no gain or phase adjustment of the signals to/from array elements 350a through 350i is required, the processor 300 can program the respective elements of controls 330 and/or 335 to unity gain/zero phase.

Processor 300 can comprise one or more general-purpose microprocessors, one or more special-purpose microprocessors, one or more digital signal processors (DSPs), one or more application specific integrated circuits (ASICs), and/or one or more other types of computer arrangement known to persons of ordinary skill in the art. Furthermore, processor 300 can be programmable and/or configured to perform the functions described herein by executable software code stored in an accessible memory or other type of computer-readable medium. In some exemplary embodiments, memory and/or other computer-readable medium (e.g., including RAM, ROM, memory stick, floppy drive, memory card, etc.) can be permanently programmed and/or configured with such executable software code, while in other exemplary embodiments, the memory or computer-readable medium can have the executable software code downloaded and/or configured.

Receive conversion circuit 315 and transmit conversion circuit 325 can be configured in various ways in relation to antenna elements 350a-i. In an exemplary digital beamforming architecture, the signal from (or to) each antenna element is processed by a separate ADC (or DAC) and receive (or transmit) chain, such that processing of the received signals can be performed entirely in the digital domain. This exemplary architecture potentially allows directing beams in infinite directions, is able to support an arbitrary number of spatial streams, and can provide spatial division multiplexing to communicate to multiple devices simultaneously.

In an exemplary analog beamforming architecture, the analog signals from (or to) the antenna elements are first combined by an analog phased array, either at radio frequency (RF) or at intermediate frequency (IF, e.g., before or after the mixer). The combined signal can then be processed by a single A/D (or D/A) converter. Since this design requires only one A/D or D/A, it can consume less energy compared to the fully digital approach. However, the analog phased array can be oriented in only one direction at a time, thereby limiting the multiple access and searching capabilities.

In an exemplary hybrid beamforming architecture, the available antenna elements can be divided into N clusters, each with multiple elements. In the receiver, signals from all antenna elements in a cluster are combined into a single analog signal, which is then individually digitized with a single ADC. In the transmitter, a single DAC can generate a composite analog signal that is then split into multiple signals, each fed to one antenna element of the cluster. Each cluster can generate a simultaneous beam independent of the other clusters, such that the device can transmit/receive N analog beams in N simultaneous directions.

Figure 4:
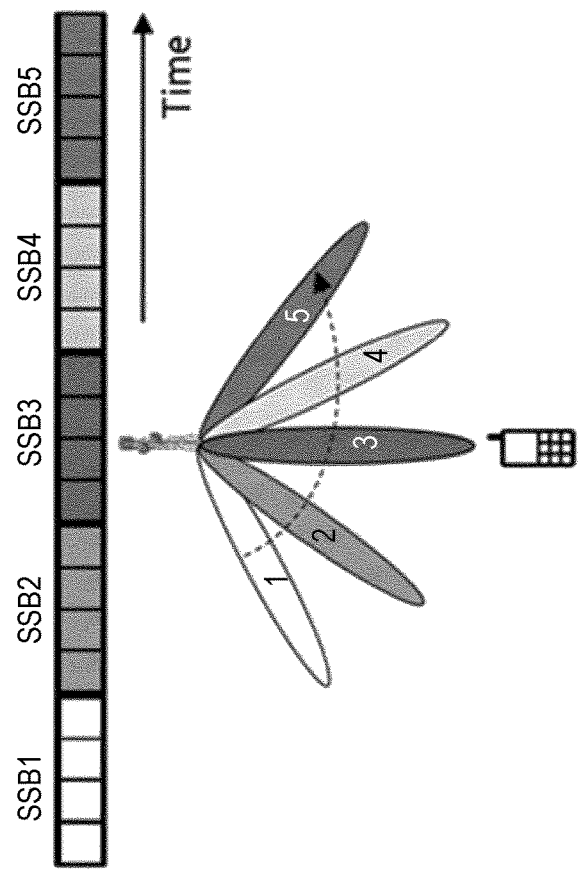
FIG. 4 shows an exemplary downlink (DL) beam-sweeping arrangement between an 5G/NR base station and UE.

In general, a base station employing multi-antenna arrays can cover its served geographic area by a set of beams transmitted and received according to a pre-defined intervals and directions in the downlink (DL). FIG. 4 illustrates an exemplary downlink (DL) beam-sweeping arrangement between an NR base station and UE. In this exemplary beam-sweeping arrangement, the base station transmits a time sequence of synchronization signal and physical broadcast control channel (SSB) blocks, labelled as SSB1-SSB5. Each SSB is associated with a particular beam used for communication and radio resource management (RRM), which are labeled 1-5 to correspond with SSBs 1-5. Each beam 1-5 is transmitted in sequence and for a predetermined duration, based on the respective timing of SSBs 1-5. Other reference signals (e.g., CSI-RS) may be transmitted in the same beam as SSB. In addition, each beam has an identifier that is associated with the reference signals carried by that particular beam.

In this manner, the base station can sweep the coverage area over the combined transmission durations of all five beams. Based on knowledge about the respective beams, the UE can measure the respective SSBs and select one of the beams based on the associated SSB measurement being the "best" according to some criteria.

As briefly mentioned above, due to the insufficient detectability of cell-specific reference signals, Positioning Reference Signals (PRS) were introduced in LTE Rel-9 to support UE RSTD measurements for OTDOA positioning.

In LTE, PRS are transmitted in pre-defined positioning occasions, each of which comprises Nprs consecutive subframes. Positioning occasions occur periodically with period Tprs. As defined in 3GPP TS 36.211, Nprs can be 1, 2, 4, or 6 while Tprs can be 160, 320, 640, or 1280 ms. In addition, PRS occasions are defined by a subframe offset Aprs relative to subframe 0, the beginning of a radio frame. Other PRS parameters include occasion group Length (e.g., how many times a PRS occasion will appear) and PRS muting pattern (e.g., a bit pattern that specifies when PRS will be muted during a PRS occasion). In LTE, PRS are transmitted only on antenna port 6 and are defined only for SCS=15 kHz.

Figure 5:
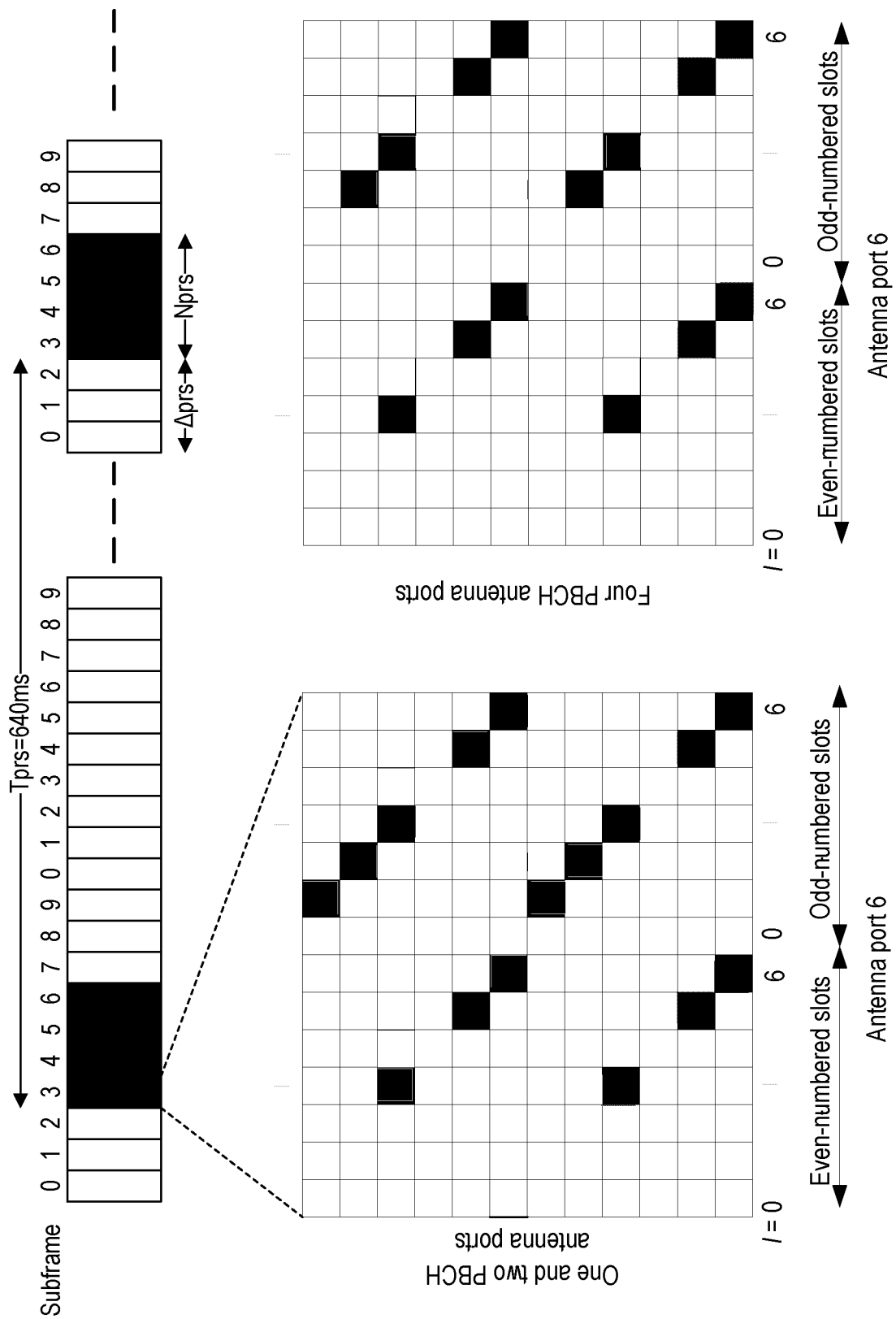
FIG. 5 shows an exemplary positioning reference signal (PRS) configuration.

FIG. 5 shows an exemplary LTE PRS configuration with Nprs=4, Δprs=3, and Tprs=640 ms. The bottom portion of FIG. 5 illustrates the mapping of PRS to resource elements (REs) transmitted during the 14 slots comprising the first positioning subframe of the first positioning occasion shown in the top portion of FIG. 5. As illustrated in FIG. 5, within each subframe, PRS are mapped in diagonal patterns with shifts in frequency and time, thereby avoiding collision with cell-specific reference signals and PBCCH, and an overlap with the PDCCH.

In addition to the use of beams for communication and RRM in NR, it is also expected that NR will employ beam-based PRS transmission, especially for FR2 region (i.e., 24 GHz and above). If so, such beams will have beam identifiers based upon the PRS that they carry, similar to the identifiers for the communication/RRM beams discussed above. In addition, there needs to be some mapping between beams used for positioning and beams used for communication/RRM (referred to hereinafter as "RRM beams").

In addition, the term "positioning beam" is used to refer to a beam via which PRS or other signals intended for positioning measurements are transmitted, and/or a beam that is used for a positioning purpose such as for measurements supporting OTDOA or AOA positioning methods. In contrast, RRM beams carrying SSB or CSI-RS are mainly used for UE RRM measurements, cell identification, and mobility.

However, the mapping relationships between positioning beams and RRM beams has not been defined for NR. For example, it has not been specified whether there will always be a common beam for both positioning and RRM and, if so, what should be the beam identifier. In addition, it has not been specified whether all RRM beams carrying SSBs should also carry. Furthermore, in case positioning beams are separate from RRM beams, it has not been specified how a UE should receive the signals in the respective beams (e.g., SSB and PRS). More generally, the relationships between positioning and RRM beams remains unspecified.

Exemplary embodiments of the present disclosure can address these and other issues, problems, and/or difficulties by providing flexible techniques for a UE to determine beams transmitting PRS and other communication-related (e.g., RRM) signals and data without ambiguity. For example, such techniques allow the UE to determine and use the relationship between positioning beams and RRM beams. Furthermore, such techniques allow a network node to determine such beam relationships and to indicate the determined relationships to the UE and/or to other nodes in the network.

Figure 6:
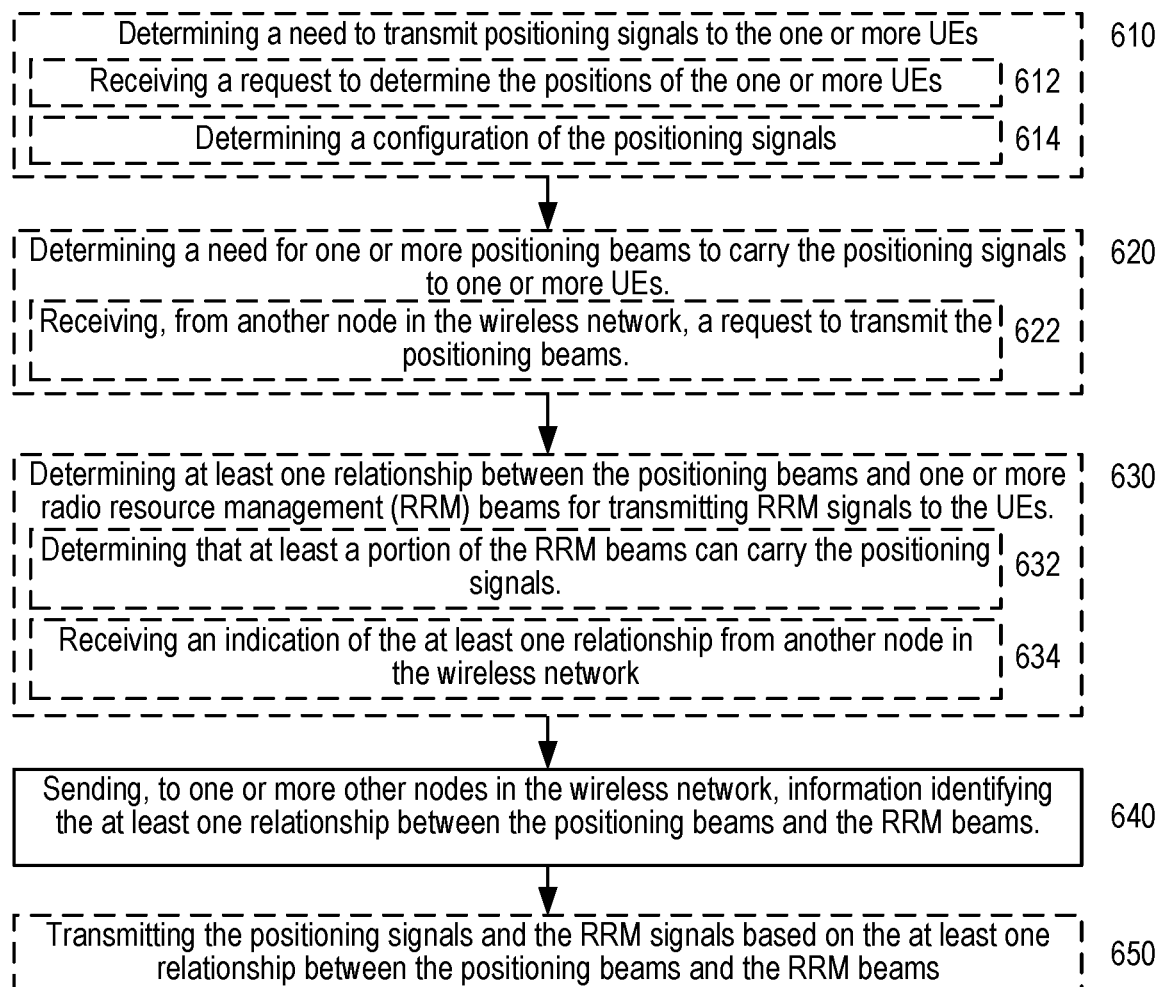
FIG. 6 is a flow diagram illustrating exemplary methods and/or procedures performed by a network node (e.g., positioning server, E-SMLC, SMLC, LMF, eNB, gNB, etc. or component thereof) according to various exemplary embodiments of the present disclosure.

FIG. 6 is a flow diagram illustrating an exemplary method and/or procedure for associating positioning signals with beams transmitted in the wireless network, according to various exemplary embodiments of the present disclosure. The exemplary method and/or procedure shown in FIG. 6 can be implemented, for example, in a network node (e.g., eNB, gNB, E-SMLC, LMF, etc.) shown in, or described in relation to, other figures herein. Furthermore, the exemplary method and/or procedure shown in FIG. 6 can be utilized cooperatively with other exemplary methods and/or procedures described herein (e.g., FIG. 7) to provide various exemplary benefits described herein. Although FIG. 6 shows blocks in a particular order, this order is merely exemplary and the operations of the exemplary method and/or procedure can be performed in a different order than shown, and can be combined and/or divided into blocks having different functionality than shown. Optional operations are indicated by dashed lines.

In some embodiments, the exemplary method and/or procedure can include the operations of block 610, in which the network node can determine a need for the one or more positioning beams to carry positioning signals to one or more UEs. In some embodiments, the operations of block 610 can include the operations of sub-block 612, where the network node can receive a request to determine the positions of the one or more UEs. Such a request can be received, for example, from the UE, another node in the network, or an entity (e.g., application) outside of the network via a gateway function (e.g., GMLC, LMF, etc.).

In some embodiments, the operations of block 610 can include the operations of sub-block 614, where the network node can determine a configuration of the positioning signals. The configuration can include one or more of the following: cell in the wireless network, direction, frequency range, frequency bandwidth, time duration, and periodicity. These and other aspects of block 610 are explained in more detail below.

The need for positioning signals can be based on a need for positioning one or more UEs, e.g., upon a request from the UE or another network node or external entity. Further, determining the need for positioning signals can include determining the necessary positioning signal configuration (e.g., in which cell, in which direction, bandwidth, time and/or frequency resources, bandwidth part, etc.) and whether the already configured positioning signals (if any) are sufficient for or comprising the necessary positioning signal configuration. The determining of the necessity and/or sufficiency may be based, e.g., on measurements (e.g., indicative of serving and/or best cells or beams, a rough UE location or direction in which the UE is location, floor, city block, etc.), measurement requirements or measurement accuracy requirements (e.g., minimum bandwidth, number of samples or positioning signal occasions, signal density in time and/or frequency, signal periodicity, positioning signal occasion length or the number of consecutive positioning signal resources, etc.), desired position accuracy or uncertainty (e.g., depends on positioning method, application, purpose, etc.), etc.

In some embodiments, the exemplary method and/or procedure can include the operations of block 620, in which the network node can determine a need for one or more positioning beams to carry the positioning signals to the one or more UEs. In some embodiments, the operations of block 620 can include the operations of sub-block 622, where the network node can receive a request to transmit the positioning beams from another node in the wireless network. Such a request can be received, for example, from a UE, a node in a radio access network (RAN, e.g., NG-RAN node such as gNB), or a node/function in a core network (CN, e.g., 5GC function such as LMF).

In some embodiments, determining the need for positioning beams can be based on a configuration of the positioning signals. For example, such a configuration can be received together with a request (e.g., in sub-block 622). Similar to block 614, the configuration can include one or more of the following: cell in the wireless network, direction, frequency range, frequency bandwidth, time duration, and periodicity. These and other aspects of block 620 are explained in more detail below.

The need for positioning beams can be based on whether directional transmission is needed within a cell and/or whether such transmissions are already configured and sufficient. The determination can be based on a request of beam-based transmissions from another node or may depend on the positioning method, desired position accuracy and/or uncertainty, frequency range (e.g., FR2 vs. FR1), availability of coarse UE location (e.g., indicating a subset of directions that positioning signals need to be transmitted), etc.

In some embodiments, the exemplary method and/or procedure can include the operations of block 630, in which the network node can determine at least one relationship between the positioning beams and one or more radio resource management (RRM) beams for transmitting RRM signals to the UEs. In some embodiments, the at least one relationship can include coverage of the positioning beams relative to the RRM beams. In some embodiments, the at least one relationship can include a relationship between the positioning signals and one or more RRM signals carried by the RRM beams. In some embodiments, the at least one relationship can include a quasi-colocation (QCL) relationship between the positioning signals and the RRM signals. In some embodiments, the one or more RRM signals can include respective synchronization signal and PBCCH blocks (SSBs).

In some embodiments, the operations of block 630 can include the operations of sub-block 632, where the network node can determine that at least a portion of the RRM beams can carry the positioning signals. In some embodiments, the operations of block 630 can include the operations of sub-block 634, where the network node can receive an indication of the at least one relationship from another node in the wireless network. Such an indication can be received, for example, from a node in a RAN (e.g., NG-RAN node such as gNB) or a node/function in a CN (e.g., 5GC function such as LMF). These and other aspects of block 630 are explained in more detail below.

In general, determining the relationship between RRM beams and positioning beams can be based on one or more of the following:
  a message received from another node indicative of the relationship;
  determining/configuring of the association of positioning signals with one or more RRM signals/channels characterizing RRM beams (e.g., with specific SSBs);

determining/configuring of the similarity of propagation or channel properties between the positioning signals and one or more RRM signals/channels characterizing RRM beams (e.g., assuming a certain type of quasi co-location (QCL) between the positioning signals and the RRM signals or CORESETs);

default or pre-defined configuration, e.g., the number of positioning beams is the same as the number of SSBs and the positioning signal resources may be associated with corresponding SSB resources in which case either all RRM beams can carry corresponding positioning signals or a subset of RRM beams can carry positioning signals;

determining/configuring whether the coverage of the positioning beam is the same as or different from that the RRM beam;

determining/configuring that the number/set of configurable positioning beams (e.g., up to N_pos beams) is different from the number/set of configurable RRM beams (e.g., up to N_RRM beams, where N_RRM≤64 in FR2 and N_RRM≤8 in FR1), suggesting that the positioning beams are different and/or have different coverage compared to RRM beams. For example, N_pos>N_RRM may suggest narrower positioning beams or NR_pos<N_RRM may suggest wider positioning beams.

The exemplary method and/or procedure can include the operations of block 940, in which the network node can send, to one or more other nodes in the wireless network, information identifying the at least one relationship between the positioning beams and the RRM beams. In some embodiments, the network node can be a base station (e.g., eNB, gNB, etc., or component thereof), and the one or more other nodes can include at least one of the following: the one or more UEs, and a location server (e.g., E-SMLC, LMF, etc.). In other embodiments, the network node can be is a location server and the one or more other nodes can include at least one of the following: the one or more UEs, and one or more base stations. These and other aspects of block 640 are explained in more detail below.

For example, a network node (e.g., gNB) can use NRPPa protocol to inform another network node (e.g., LMF) about various indices that have been used for a beam. If a particular beam is used for RRM, then SSB index and/or CSI-RS index can be included, and if the beam is transmitting positioning signals then PRS index can be included. For beams that can transmit both RRM and positioning, the mapping or all of the associated IDs of the beam can be sent to the LMF. The LMF can send such information to the UE, e.g., via LPP.

As another example, if a beam only transmits PRS, then a gNB can inform LMF via NRPPa protocol about that positioning beam and a corresponding RRM beam. More specifically, an additional information element (IE) can be included in the NRPPa to represent the corresponding RRM beams with regards to the PRS beam.

As another example, in order to minimize the signaling overhead, a flag (i.e., Boolean Enumerated ASN.1 data type) is included in the NRPPa message, with the I/O values indicating whether or not the beam is used for any other purpose than positioning.

As another example, the LMF can forward such information received from the gNB, via NRPPa, to the UE via LPP. Alternately, the UE can obtain the beam relationships from the gNB via RRC signaling, such as when the gNB can have some degree of location server functionality. Moreover, this approach can also be used for UL beam relationships, such as for an UL SRS beam that can be used for both positioning and RRM.

In some embodiments, the exemplary method and/or procedure can also include the operations of block 650, in which the network node can transmit the positioning signals and the RRM signals based on the at least one relationship between the positioning beams and the RRM beams.

Figure 7:
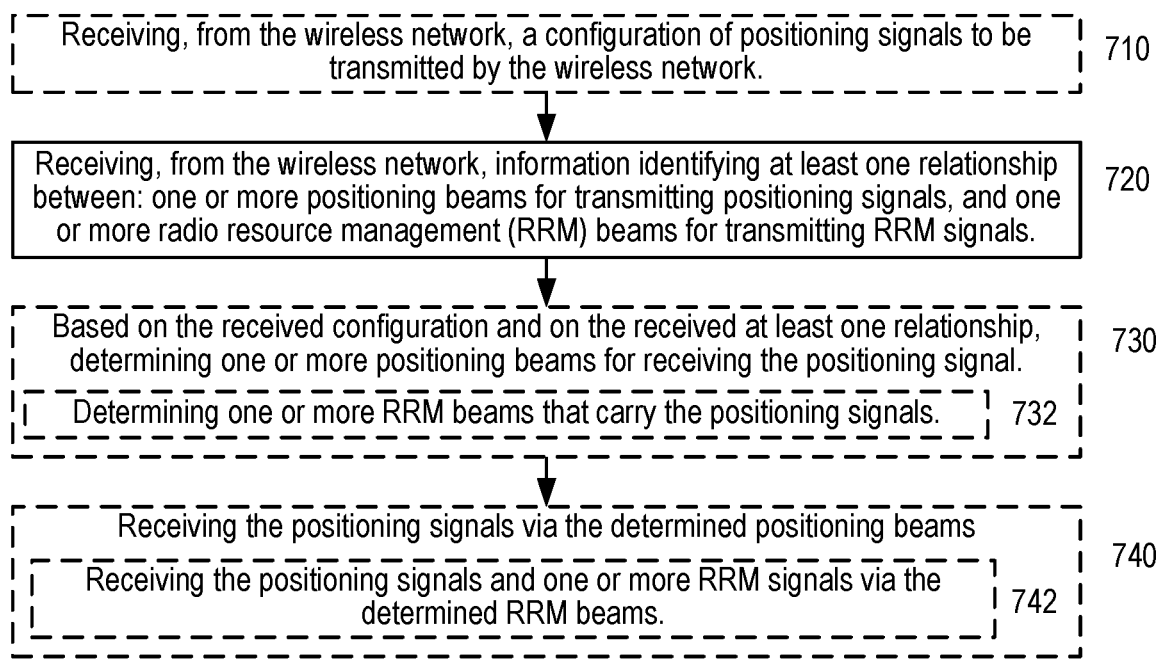
FIG. 7 is a flow diagram illustrating exemplary methods and/or procedures performed by a user equipment (UE, e.g., wireless device, IoT device, etc. or component thereof), according to various exemplary embodiments of the present disclosure.

FIG. 7 is a flow diagram illustrating an exemplary method and/or procedure for associating positioning signals with beams transmitted in a wireless network, according to various exemplary embodiments of the present disclosure. The exemplary method and/or procedure shown in FIG. 7 can be implemented by a user equipment (UE, e.g., wireless device, IoT device, etc. or component thereof) such as shown in, or described in relation to, other figures herein. Furthermore, the exemplary method and/or procedure shown in FIG. 7 can be utilized cooperatively with other exemplary methods and/or procedures described herein (e.g., FIG. 6) to provide various exemplary benefits described herein. Although FIG. 7 shows blocks in a particular order, this order is merely exemplary and the operations of the exemplary method and/or procedure can be performed in a different order than shown, and can be combined and/or divided into blocks having different functionality than shown. Optional operations are indicated by dashed lines.

In some embodiments, the exemplary method and/or procedure can include the operations of block 710, in which the UE can receive, from the wireless network, a configuration of positioning signals to be transmitted by the wireless network. For example, the configuration can be received as assistance data from the wireless network (e.g., from the LMF). The configuration can include various information defining PRS, such as discussed above, as well as information identifying particular cells (e.g., serving and neighbor cells) that will be transmitting the PRS.

The exemplary method and/or procedure can include the operations of block 720, in which the UE can receive, from the wireless network, information identifying at least one relationship between: one or more positioning beams for transmitting the positioning signals, and one or more radio resource management (RRM) beams for transmitting RRM signals. In some embodiments, the at least one relationship can include coverage of the positioning beams relative to the RRM beams. In some embodiments, the at least one relationship can include a relationship between the positioning signals and one or more RRM signals carried by the RRM beams. In some embodiments, the at least one relationship can include a quasi-colocation (QCL) relationship between the positioning signals and the RRM signals. In some embodiments, the one or more RRM signals can include respective synchronization signal and PBCCH blocks (SSBs). In some embodiments, the information identifying each relationship can include an index of a particular positioning beam, and indices of one or more corresponding RRM beams.

For example, the at least one relationship can be determined based on a message or assistance data from location server and/or base station. Similarly, the UE can also combine the information received from base station and location server in order to perform positioning measurements. The relationship may be determined based on the same principles as described above in relation to the network node embodiments.

The exemplary method and/or procedure can also include the operations of block 730, in which the UE can, based on the received configuration and on the received at least one relationship, determine one or more positioning beams for receiving the positioning signals. In some embodiments, the operations of block 730 can include the operations of sub-block 732, where the UE can determine one or more RRM beams that carry the positioning signals.

In some embodiments, the exemplary method and/or procedure can also include the operations of block 740, in which the UE can receive the positioning signals via the determined positioning beams. In some embodiments, the operations of block 740 can include the operations of sub-block 742, where the UE can receive the positioning signals and one or more RRM signals via the determined one or more RRM beams. In other words, the UE can receive both positioning and RRM signals via the same RRM beam(s).

With respect to the operations in blocks 730-740, the UE can use the determined relationship for receiving the positioning signal(s) and performing corresponding positioning measurements. For example, the UE may adapt its receiver configuration, measurement procedure, and/or processing/combining of the received samples. In some cases, the UE may also be required to meet one or more performance requirements related to the positioning measurements, such as accuracy and measurement time. These also can be adapted based on the determined beam relationship(s). Furthermore, the requirements may differ for the case when positioning and RRM beams are identical as compared to the case when positioning beams are different from RRM beams. For example, when the beams are the same the UE may be able to receive at the same time RRM signals and positioning signals, while if the beams are different the UE may receive only RRM or only positioning signals at any given time. In case the signals overlap in time, the UE may then need to prioritize one over another.

Figure 8:
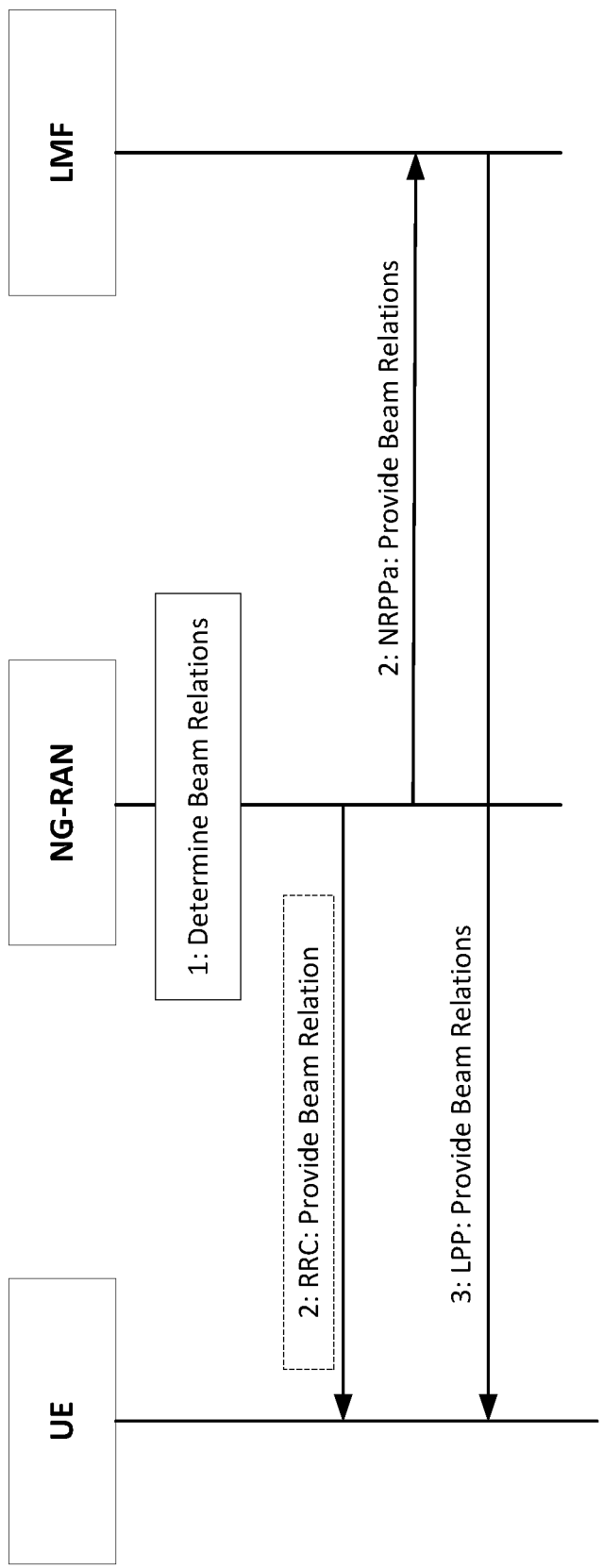
FIG. 8 is a flow diagram illustrating operations between a UE, an NG-RAN, and a location management function (LMF), according to various exemplary embodiments of the present disclosure.

FIG. 8 illustrates an alternate view of the exemplary operations illustrated in FIGS. 6-7. More specifically, FIG. 8 is a flow diagram illustrating interactive operations between a UE, an NG-RAN, and a location management function (LMF) in a 5G core (5GC) network, according to various exemplary embodiments of the present disclosure. Although the determination of beam relations is shown as being performed by NG-RAN, this is merely exemplary and this operation can be performed by LMF or any other logical node.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 9:
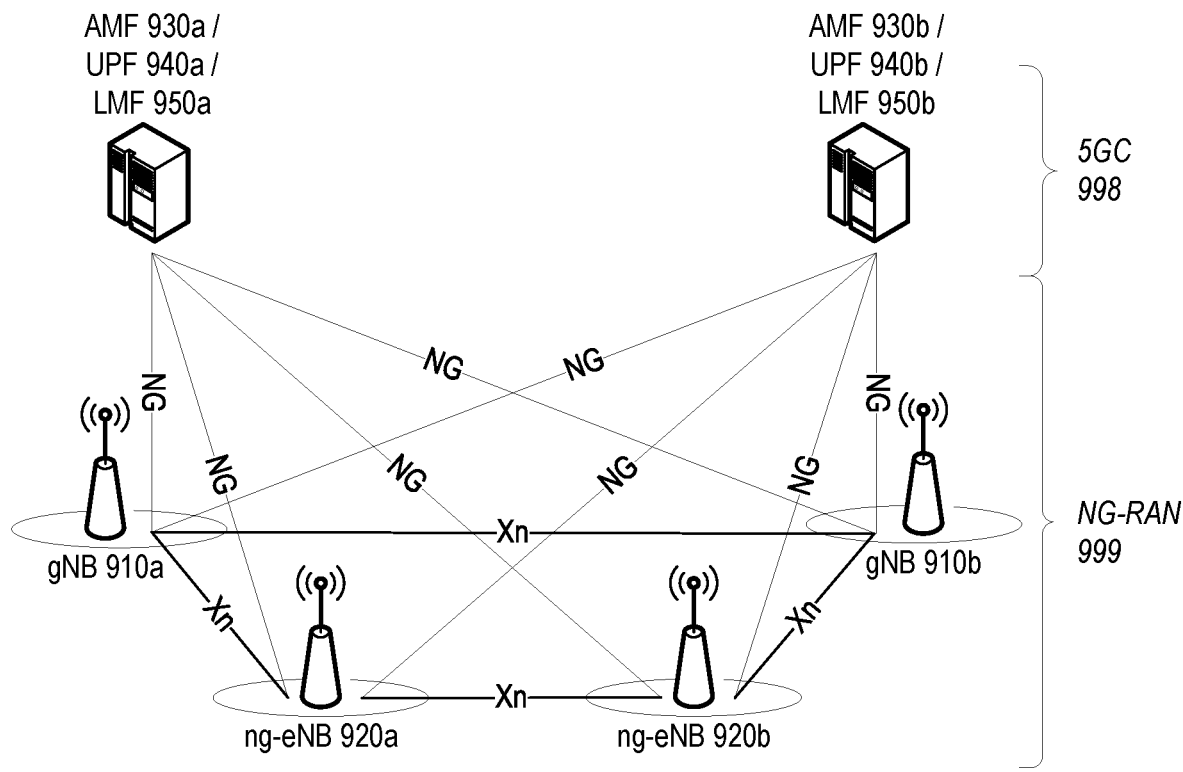
FIG. 9 shows a high-level view of an exemplary 5G network architecture, including a Next Generation Radio Access Network (NG-RAN) and a 5G Core (5GC), according to various exemplary embodiments of the present disclosure.

FIG. 9 shows a high-level view of an exemplary 5G network architecture, including a Next Generation Radio Access Network (NG-RAN) 999 and a 5G Core (5GC) 998 in which embodiments of the present disclosure described above with respect to FIGS. 6 to 8 may be implemented. As shown in the figure, NG-RAN 999 can include gNBs 910 (e.g., 910*a,b*) and ng-eNBs 920 (e.g., 920*a,b*) that are interconnected with each other via respective Xn interfaces. The gNBs and ng-eNBs are also connected via the NG interfaces to 5GC 998, more specifically to the AMF (Access and Mobility Management Function) 930 (e.g., AMFs 930*a,b*) via respective NG-C interfaces and to the UPF (User Plane Function) 940 (e.g., UPFs 940*a,b*) via respective NG-U interfaces.

NG-RAN 999 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB can be connected to all 5GC nodes within an "AMF Region," which is defined in 3GPP TS 23.501. If security protection for CP and UP data on TNL of NG-RAN interfaces is supported, NDS/IP (3GPP TS 33.401) can be applied.

Each of the gNBs 910*a,b* can support the NR radio interface, including frequency division duplexing (FDD), time division duplexing (TDD), or a combination thereof. In contrast, each of ng-eNBs 920*a,b* supports the LTE radio interface but, unlike conventional LTE eNBs, connect to the 5GC via the NG interface. In addition, the gNBs 910*a,b* and ng-eNBs 920*a,b* can provide multi-RAT (radio access technology) dual connectivity (MR-DC) to UEs as described above, including NG-RAN E-UTRA/NR Dual Connectivity (NGEN-DC).

Each of the gNBs 910*a,b* can include a central (or centralized) unit (CU or gNB-CU) and one or more distributed (or decentralized) units (DU or gNB-DU). Likewise, each of the en-gNBs 920*a,b* shown in FIG. 9 can include a CU and one or more DUs. The CUs are logical nodes that host higher-layer protocols and perform various gNB functions such controlling the operation of DUs. Similarly, the DUs are logical nodes that host lower-layer protocols and can include various subsets of the gNB functions, depending on the functional split. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

Another change in 5G networks (e.g., in 5GC) is that traditional peer-to-peer interfaces and protocols (e.g., those found in LTE/EPC networks) are modified by a so-called Service Based Architecture (SBA) in which Network Functions (NFs) provide one or more services to one or more service consumers. This SBA model, which further adopts principles like modularity, reusability and self-containment of NFs, can enable deployments to take advantage of the latest virtualization and software technologies.

In general, a NF service is a type of capability exposed by one NF (Service Producer) to other authorized NFs (Service Consumers) through a service-based interface (SBI). A NF service may support one or more NF service operation(s). Access to these various services can be provided, for example, by Hyper Text Transfer Protocol/Representational State Transfer (HTTP/REST) application programming interfaces (APIs). In general, the various services are self-contained functionalities that can be changed and modified in an isolated manner without affecting other services. Furthermore, the services are composed of various "service operations", which are more granular divisions of the overall service functionality. In order to access a service, both the service name and the targeted service operation must be indicated. The interactions between service consumers and producers can be of the type "request/response" or "subscribe/notify".

Figure 10:
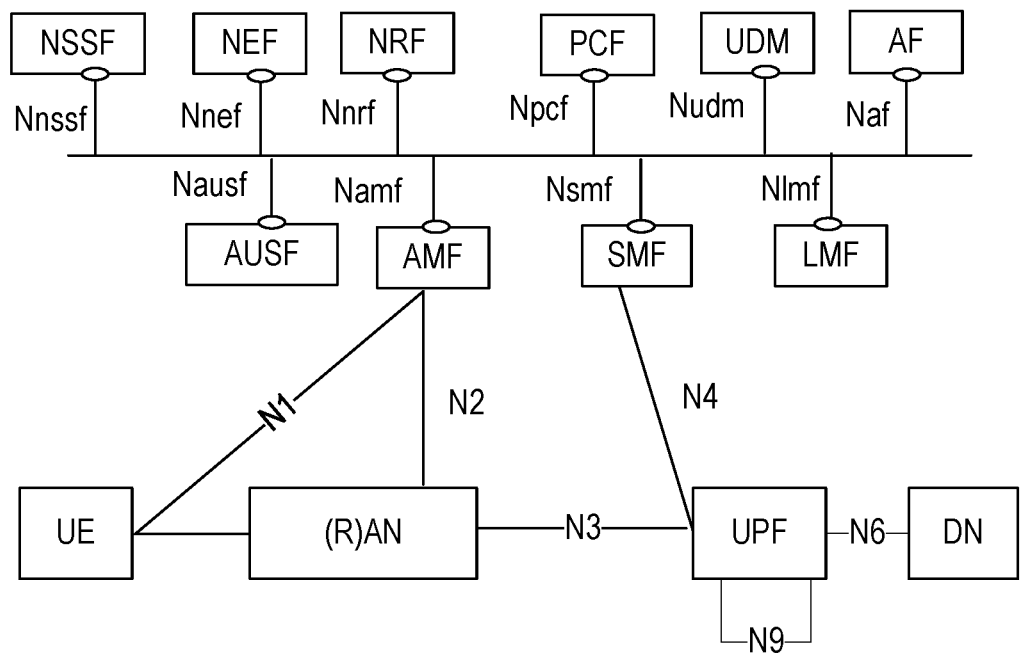
FIG. 10 shows an exemplary non-roaming 5G reference architecture with service-based interfaces and various network functions (NFs), as further described in 3GPP TS 23.501.

FIG. 10 shows an exemplary non-roaming 5G reference architecture with service-based interfaces and various 3GPP-defined NFs within the Control Plane (CP), including:

Access and Mobility Management Function (AMF) with Namf interface;
Session Management Function (SMF) with Nsmf interface;
User Plane Function (UPF) with Nupf interface;
Policy Control Function (PCF) with Npcf interface;
Network Exposure Function (NEF) with Nnef interface;
Network Repository Function (NRF) with Nnrf interface;
Network Slice Selection Function (NSSF) with Nnssf interface;
Authentication Server Function (AUSF) with Nausf interface;
Application Function (AF) with Naf interface;
Location Management Function (LMF) with Nlmf interface; and
Unified Data Management (UDM) with Nudm interface.

The UDM is similar to the HSS in LTE/EPC networks discussed above. UDM supports Generation of 3GPP AKA authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

The services in 5GC will likely be built in a stateless way, such that the business logic and data context will be separated. This means that the services store their context externally in a proprietary database. This can facilitate various cloud infrastructure features like auto-scaling or auto-healing. The NRF allows every NF to discover the services offered by other NFs, and Data Storage Functions (DSF) allow every NF to store its context. In addition, the NEF provides exposure of capabilities and events of the 5GC to application functions (AFs) within the 5GC and outside of the 5GC. For example, NEF provides a service that allows an AF to provision specific subscription data (e.g., expected UE behavior) for various UEs.

Figure 11:
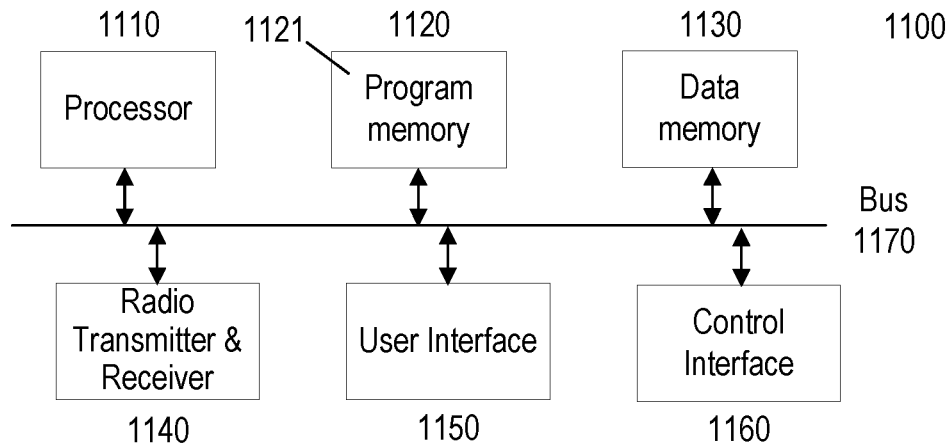
FIG. 11 is a block diagram of an exemplary wireless device or user equipment, according to various exemplary embodiments of the present disclosure.

FIG. 11 shows a block diagram of an exemplary wireless device or user equipment (UE) 1100 configurable according to various exemplary embodiments of the present disclosure, including execution of instructions on a computer-readable medium that correspond to operations of one or more exemplary methods and/or procedures described herein above.

Exemplary device 1100 can comprise a processor 1110 that can be operably connected to a program memory 1140 and/or a data memory 1150 via a bus 1170 that can comprise parallel address and data buses, serial ports, or other methods and/or structures known to those of ordinary skill in the art. Program memory 1140 can store software code, programs, and/or instructions (collectively shown as computer program product 1141 in FIG. 11) executed by processor 1110 that can configure and/or facilitate device 1100 to perform various operations, including exemplary methods and/or procedures described herein, for example those described above with respect to FIG. 7.

More generally, program memory 1140 can store software code or program executed by processor 1110 that facilitates, causes and/or programs exemplary device 1100 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1140, user interface 1150, and/or host interface 1160.

As a more specific example, processor 1110 can execute program code stored in program memory 1140 that corresponds to MAC, RLC, PDCP, and RRC layer protocols standardized by 3GPP (e.g., for NR and/or LTE). As a further example, processor 1110 can execute program code stored in program memory 1140 that, together with radio transceiver 1140, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

Program memory 1140 can also store software code executed by processor 1110 to control the functions of device 1100, including configuring and controlling various components such as radio transceiver 1140, user interface 1150, and/or host interface 1160. Program memory 1140 can also store one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition or as an alternative, program memory 1140 can comprise an external storage arrangement (not shown) remote from device 1100, from which the instructions can be downloaded into program memory 1140 located within or removably coupled to device 1100, so as to enable execution of such instructions.

Data memory 1150 can comprise memory area for processor 1110 to store variables used in protocols, configuration, control, and other functions of device 1100, including operations corresponding to, or comprising, any of the exemplary methods and/or procedures described herein. Moreover, program memory 1140 and/or data memory 1150 can comprise non-volatile memory (e.g., flash memory), volatile memory (e.g., static or dynamic RAM), or a combination thereof. Furthermore, data memory 1150 can comprise a memory slot by which removable memory cards in one or more formats (e.g., SD Card, Memory Stick, Compact Flash, etc.) can be inserted and removed. Persons of ordinary skill in the art will recognize that processor 1110 can comprise multiple individual processors (including, e.g., multi-core processors), each of which implements a portion of the functionality described above. In such cases, multiple individual processors can be commonly connected to program memory 1140 and data memory 1150 or individually connected to multiple individual program memories and or data memories. More generally, persons of ordinary skill in the art will recognize that various protocols and other functions of device 1100 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

A radio transceiver 1140 can comprise radio-frequency transmitter and/or receiver functionality that facilitates the device 1100 to communicate with other equipment supporting like wireless communication standards and/or protocols. In some exemplary embodiments, the radio transceiver 1140 includes a transmitter and a receiver that enable device 1100 to communicate with various 5G/NR networks according to various protocols and/or methods proposed for standardization by 3GPP and/or other standards bodies. For example, such functionality can operate cooperatively with processor 1110 to implement a PHY layer based on OFDM, OFDMA, and/or SC-FDMA technologies, such as described herein with respect to other figures. In some exemplary embodiments, the radio transceiver 1140 can comprise some or all of the receiver functionality shown in and described above with reference to FIG. 6.

In some exemplary embodiments, the radio transceiver 1140 includes an LTE transmitter and receiver that can facilitate the device 1100 to communicate with various LTE LTE-Advanced (LTE-A), and/or NR networks according to standards promulgated by 3GPP. In some exemplary embodiments of the present disclosure, the radio transceiver 1140 includes circuitry, firmware, etc. necessary for the device 1100 to communicate with various 5G/NR, LTE, LTE-A, UMTS, and/or GSM/EDGE networks, also according to 3GPP standards. In some exemplary embodiments of the present disclosure, radio transceiver 1140 includes circuitry, firmware, etc. necessary for the device 1100 to communicate with various CDMA2000 networks, according to 3GPP2 standards.

In some exemplary embodiments of the present disclosure, the radio transceiver 1140 is capable of communicating using radio technologies that operate in unlicensed frequency bands, such as IEEE 802.14 WiFi that operates using frequencies in the regions of 2.4, 5.14, and/or 140 GHz. In some exemplary embodiments of the present disclosure, radio transceiver 1140 can comprise a transceiver that is capable of wired communication, such as by using IEEE 802.3 Ethernet technology. The functionality particular to each of these embodiments can be coupled with or controlled by other circuitry in the device 1100, such as the processor 1110 executing program code stored in program memory 1140 in conjunction with, or supported by, data memory 1150.

User interface 1150 can take various forms depending on the particular embodiment of device 1100, or can be absent from device 1100 entirely. In some exemplary embodiments, user interface 1150 can comprise a microphone, a loudspeaker, slidable buttons, depressable buttons, a display, a touchscreen display, a mechanical or virtual keypad, a mechanical or virtual keyboard, and/or any other user-interface features commonly found on mobile phones. In other embodiments, the device 1100 can comprise a tablet computing device including a larger touchscreen display. In such embodiments, one or more of the mechanical features of the user interface 1150 can be replaced by comparable or functionally equivalent virtual user interface features (e.g., virtual keypad, virtual buttons, etc.) implemented using the touchscreen display, as familiar to persons of ordinary skill in the art. In other embodiments, the device 1100 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the device 1100 having a touch screen display are capable of receiving user inputs, such as inputs related to exemplary methods and/or procedures described herein or otherwise known to persons of ordinary skill in the art.

In some exemplary embodiments of the present disclosure, device 1100 can comprise an orientation sensor, which can be used in various ways by features and functions of device 1100. For example, the device 1100 can use outputs of the orientation sensor to determine when a user has changed the physical orientation of the device 1100's touch screen display. An indication signal from the orientation sensor can be available to any application program executing on the device 1100, such that an application program can change the orientation of a screen display (e.g., from portrait to landscape) automatically when the indication signal indicates an approximate 140-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1160 of the device 1100 can take various forms depending on the particular exemplary embodiment of device 1100 and of the particular interface requirements of other devices that the device 1100 is intended to communicate with and/or control. For example, the control interface 1160 can comprise an RS-232 interface, an RS-485 interface, a USB interface, an HDMI interface, a Bluetooth interface, an IEEE 14144 ("Firewire") interface, an $I^2C$ interface, a PCMCIA interface, or the like. In some exemplary embodiments of the present disclosure, control interface 1160 can comprise an IEEE 802.3 Ethernet interface such as described above. In some exemplary embodiments of the present disclosure, the control interface 1160 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the device 1100 can comprise more functionality than is shown in FIG. 11 including, for example, a video and/or still-image camera, microphone, media player and/or recorder, etc. Moreover, radio transceiver 1140 can include circuitry necessary to communicate using additional radio-frequency communication standards including Bluetooth, GPS, and/or others. Moreover, the processor 1110 can execute software code stored in the program memory 1140 to control such additional functionality. For example, directional velocity and/or position estimates output from a GPS receiver can be available to any application program executing on the device 1100, including various exemplary methods and/or computer-readable media according to various exemplary embodiments of the present disclosure.

Figure 12:
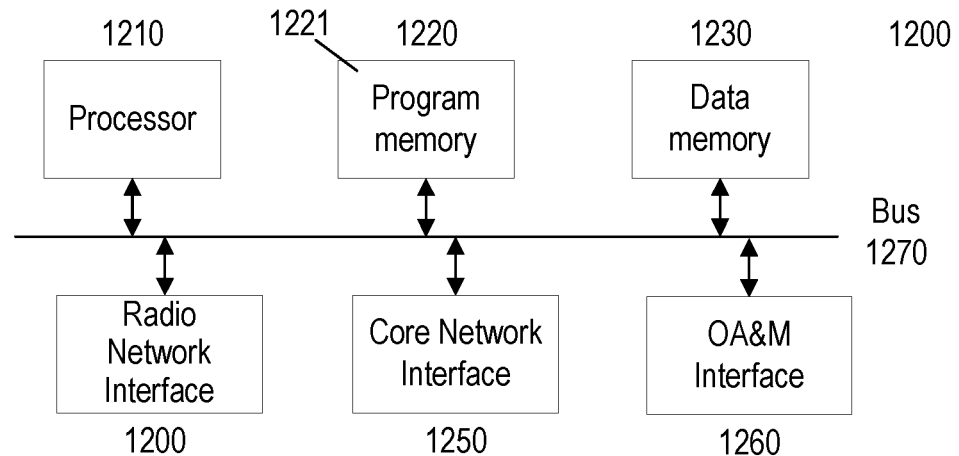
FIG. 12 is a block diagram of an exemplary network node (e.g., a base station, eNB, gNB, etc.), according to various exemplary embodiments of the present disclosure.

FIG. 12 shows a block diagram of an exemplary network node 1200 configurable according to various embodiments of the present disclosure, including those described above with reference to other figures. In some exemplary embodiments, network node 1200 can comprise a base station, eNB, gNB, or component thereof. Network node 1200 comprises processor 1210 which is operably connected to program memory 1220 and data memory 1230 via bus 1270, which can comprise parallel address and data buses, serial ports, or other methods and/or structures known to those of ordinary skill in the art. In some exemplary embodiments, processor 1210 can comprise some or all of the functionality of processor 300 shown in FIG. 3 and discussed in more detail above.

Program memory 1220 can store software code, programs, and/or instructions (collectively shown as computer program product 1221 in FIG. 12) executed by processor 1210 that can configure and/or facilitate network node 1200 to communicate with one or more other devices using protocols according to various embodiments of the present disclosure, including one or more exemplary methods and/or procedures discussed above, for example those described above with respect to FIGS. 6 and 8. Program memory 1220 can also store software code executed by processor 1210 that can facilitate and specifically configure network node 1200 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 1240 and core network interface 1250. Program memory 1220 can also store software code executed by processor 1210 to control the functions of network node 1200, including configuring and controlling various components such as radio network interface 1240 and core network interface 1250.

Data memory 1230 can comprise memory area for processor 1210 to store variables used in protocols, configuration, control, and other functions of network node 1200. As such, program memory 1220 and data memory 1230 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1210 can comprise multiple individual processors (not shown), each of which implements a portion of the functionality described above. In such case, multiple individual processors may be commonly connected to program memory 1220 and data memory 1230 or individually connected to multiple individual program memories and/or data memories. More generally, persons of ordinary skill in the art will recognize that various protocols and other functions of network node 1200 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1240 can comprise transmitters, receivers, signal processors, ASICs, antennas, beamforming units, and other circuitry that enables network node 1200 to communicate with other equipment such as, in some embodiments, a plurality of compatible user equipment (UE). In some exemplary embodiments, radio network interface can comprise various protocols or protocol layers, such as the PHY, MAC, RLC, PDCP, and RRC layer protocols standardized by 3GPP for LTE, LTE-A, and/or 5G/NR; improvements thereto such as described herein above; or any other higher-layer protocols utilized in conjunction with radio network interface 1240. According to further exemplary embodiments of the present disclosure, the radio network interface 1240 can comprise a PHY layer based on OFDM, OFDMA, and/or SC-FDMA technologies. In some embodiments, the functionality of such a PHY layer can be provided cooperatively by radio network interface 1240 and processor 1210 (including program code in memory 1220).

Core network interface 1250 can comprise transmitters, receivers, and other circuitry that enables network node 1200 to communicate with other equipment in a core network such as, in some embodiments, circuit-switched (CS) and/or packet-switched Core (PS) networks. In some embodiments, core network interface 1250 can comprise the S1 interface standardized by 3GPP. In some exemplary embodiments, core network interface 1250 can comprise one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of core network interface 1250 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

By way of example and without limitation, core network interface 1250 can comprise one or more of the S1, S1-U, and NG interfaces standardized by 3GPP. Also by way of example, radio network interface 1240 can comprise the Uu interface standardized by 3GPP.

OA&M interface 1260 can comprise transmitters, receivers, and other circuitry that enables network node 1200 to communicate with external networks, computers, databases, and the like for purposes of operations, administration, and maintenance of network node 1200 or other network equipment operably connected thereto. Lower layers of OA&M interface 1260 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1240, core network interface 1250, and OA&M interface 1260 may be multiplexed together on a single physical interface, such as the examples listed above.

Figure 13:
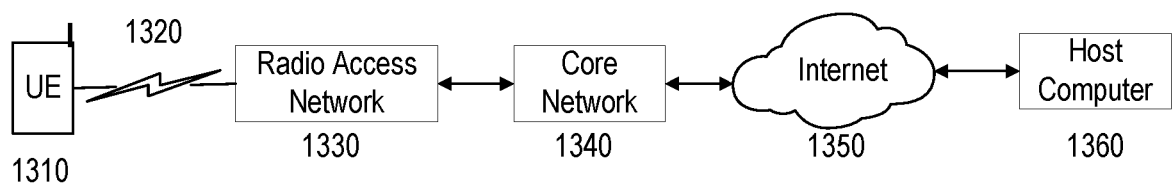
FIG. 13 is a block diagram of an exemplary network configuration usable to provide over-the-top (OTT) data services between a host computer and a user equipment, according to various exemplary embodiments of the present disclosure.

FIG. 13 is a block diagram of an exemplary network configuration usable to provide over-the-top (OTT) data services between a host computer and a user equipment (UE), according to one or more exemplary embodiments of the present disclosure. UE 1310 can communicate with radio access network (RAN) 1330 over radio interface 1320, which can be based on protocols described above including, e.g., LTE, LTE-A, and 5G/NR. RAN 1330 can include one or more network nodes (e.g., base stations, eNBs, gNBs, ng-eNBs, en-gNBs, controllers, etc.). RAN 1330 can further communicate with core network 1340 according to various protocols and interfaces described above. For example, one or more apparatus (e.g., base stations, eNBs, gNBs, etc.) comprising RAN 1330 can communicate to core network 1340 via core network interface 1250 described above. In some exemplary embodiments, RAN 1330 and core network 1340 can be configured and/or arranged as shown in other figures discussed above. Similarly, UE 1310 can also be configured and/or arranged as shown in other figures discussed above.

Core network 1340 can further communicate with an external packet data network, illustrated in FIG. 13 as Internet 1350, according to various protocols and interfaces known to persons of ordinary skill in the art. Many other devices and/or networks can also connect to and communicate via Internet 1350, such as exemplary host computer 1360. In some exemplary embodiments, host computer 1360 can communicate with UE 1310 using Internet 1350, core network 1340, and RAN 1330 as intermediaries. Host computer 1360 can be a server (e.g., an application server) under ownership and/or control of a service provider. Host computer 1360 can be operated by the OTT service provider or by another entity on the service provider's behalf.

For example, host computer 1360 can provide an over-the-top (OTT) packet data service to UE 1310 using facilities of core network 1340 and RAN 1330, which can be unaware of the routing of an outgoing/incoming communication to/from host computer 1360. Similarly, host computer 1360 can be unaware of routing of a transmission from the host computer to the UE, e.g., the routing of the transmission through RAN 1330. Various OTT services can be provided using the exemplary configuration shown in FIG. 13 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 13 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

Exemplary embodiments that facilitate a UE determining beams transmitting PRS and other communication-related (e.g., RRM) signals and data, without ambiguity, can play a critical role by enabling UE 1310 and RAN 1330 to meet the requirements of the particular OTT service between host computer 1360 and UE 1310. For example, such techniques allow the UE to determine and use the relationship between positioning beams and RRM beams. In some cases, this can facilitate the UE's performance of both positioning and RRM operations based on beams transmitted by the network. By supporting beam-based operations for both RRM and positioning, the UE and network are better able to integrate both types of operations, such that the UE can continue to receive and/or transmit beams that carry data to/from the network. By improving UE and network performance in these and other ways, exemplary embodiments improve data throughput in a coverage area and enable a greater number of users to utilize data-intensive services such as streaming video in various coverage conditions without excessive power consumption or other degradations to user experience, such as dropped data connections caused by delayed handover due to measurement delays.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art.

Example embodiments of the techniques and apparatus described herein include, but are not limited to, the following enumerated examples:

1. A method, performed by a network node in a wireless network, of associating positioning signals with beams transmitted in the wireless network, the method comprising:
    sending, to one or more other nodes in the wireless network, information identifying at least one relationship between:
        one or more positioning beams for transmitting positioning signals to one or more UEs; and
        one or more radio resource management (RRM) beams for transmitting RRM signals to the one or more UEs.

2. The method of embodiment 1, wherein:
    the network node is a base station; and
    the one or more other nodes include at least one of the following: the one or more UEs, and a location server.

3. The method of embodiment 1, wherein:
    the network node is a location server; and
    the one or more other nodes include at least one of the following: the one or more UEs, and one or more base stations.

4. The method of any of embodiments 1-3, further comprising:
    determining a need for the one or more positioning beams to carry positioning signals to one or more UEs; and
    determining the at least one relationship between the positioning beams and the RRM beams.

5. The method of embodiment 4, further comprising determining a need to transmit the positioning signals to the one or more UEs.

6. The method of embodiment 6, wherein determining the need to transmit the positioning signals comprises receiving a request to determine the positions of the one or more UEs.

7. The method of any of embodiments 5-6, wherein:
    determining the need to transmit the positioning signals comprises determining a configuration of the positioning signals; and
    the configuration includes one or more of the following: cell in the wireless network, direction, frequency range, frequency bandwidth, time duration, and periodicity.

8. The method of any of embodiments 4-7, wherein determining the need for one or more positioning beams comprises receiving a request to transmit the positioning beams from another node in the wireless network.

9. The method of any of claims 4-8, wherein:
   determining the need for one or more positioning beams is based on a configuration of the positioning signals; and
   the configuration includes one or more of the following: cell in the wireless network, direction, frequency range, frequency bandwidth, time duration, and periodicity.

10. The method of any of embodiments 1-9, wherein the at least one relationship comprises coverage of the positioning beams relative to the RRM beams.

11. The method of any of embodiments 1-9, wherein the at least one relationship comprises a relationship between the positioning signals and one or more RRM signals carried by the RRM beams.

12. The method of embodiment 11, wherein the one or more RRM signals comprise respective synchronization signal and PBCCH blocks (SSBs).

13. The method of any of embodiments 11-12, wherein the at least one relationship comprises a quasi-colocation (QCL) relationship between the positioning signals and the RRM signals.

14. The method of any of embodiments 10-13, wherein determining the at least one relationship comprises determining that at least a portion of the RRM beams can carry the positioning signals.

15. The method of any of embodiments 10-13, wherein determining the at least one relationship comprises receiving an indication of the at least one relationship from another node in the wireless network.

16. The method of any of embodiments 1-15, wherein the information identifying each relationship comprises:
   an index of a particular positioning beam; and
   indices of one or more corresponding RRM beams.

17. The method of any of embodiments 1-16, further comprising transmitting the positioning signals and the RRM signals based on the at least one relationship between the positioning beams and the RRM beams.

18. A method, performed by a user equipment (UE), of associating positioning signals with beams transmitted in a wireless network, the method comprising:
   receiving, from the wireless network, information identifying at least one relationship between:
     one or more positioning beams for transmitting positioning signals, and
     one or more radio resource management (RRM) beams for transmitting RRM signals.

19. The method of embodiment 18, further comprising:
   receiving, from the wireless network, a configuration of positioning signals to be transmitted by the wireless network;
   based on the received configuration and on the received at least one relationship, determining one or more positioning beams for receiving the positioning signals; and
   receiving the positioning signals via the determined positioning beams.

20. The method of embodiment 19, wherein:
   determining one or more positioning beams comprises determining one or more RRM beams that carry the positioning signals; and
   receiving the positioning signals via the determined positioning beams comprises receiving the positioning signals and one or more RRM signals via the determined one or more RRM beams.

21. The method of any of embodiments 18-20, wherein the at least one relationship comprises coverage of the positioning beams relative to the RRM beams.

22. The method of any of embodiments 18-21, wherein the at least one relationship comprises a relationship between the positioning signals and one or more RRM signals carried by the RRM beams.

23. The method of embodiment 22, wherein the one or more RRM signals comprise respective synchronization signal and PBCCH blocks (SSBs).

24. The method of any of embodiments 22-23, wherein the at least one relationship comprises a quasi-colocation (QCL) relationship between the positioning signals and the RRM signals.

25. The method of any of embodiments 18-24, wherein the information identifying each relationship comprises:
   an index of a particular positioning beam; and
   indices of one or more corresponding RRM beams.

26. A network node configured for operation in a wireless network, the network node comprising:
   network interface circuitry configured to communicate with one or more other nodes in the wireless network; and
   processing circuitry operably coupled to the network interface circuitry, whereby the network interface circuitry and processing circuitry are configured to perform operations corresponding to the methods of any of embodiments 1-17.

27. A network node configured for operation in a wireless network, the network node being arranged to perform operations corresponding to the methods of any of embodiments 1-7.

28. A non-transitory, computer-readable medium storing computer-executable instructions that, when executed by at least one processor of a network node configured for operation in a wireless network, configure the network node to perform operations corresponding to the methods of any of embodiments 1-17.

29. A computer program product comprising computer-executable instructions that, when executed by at least one processor of a network node configured for operation in a wireless network, configure the network node to perform operations corresponding to the methods of any of embodiments 1-17.

30. A User Equipment (UE) configured to receive positioning signals in a wireless network, the UE comprising:
   a radio transceiver configured to communicate with the wireless network; and
   processing circuitry operably coupled to the radio transceiver, whereby the radio transceiver and processing circuitry are configured to perform operations corresponding to the methods of any of embodiments 18-25.

31. A user equipment (UE) configured to receive positioning signals in a wireless network, the UE being arranged to perform operations corresponding to the methods of any of embodiments 18-25.

32. A non-transitory, computer-readable medium storing computer-executable instructions that, when executed by at least one processor of a user equipment (UE), configure the UE to perform operations corresponding to the methods of any of embodiments 18-25.

33. A computer program product comprising computer-executable instructions that, when executed by at least one processor of a user equipment (UE), configure the UE to perform operations corresponding to the methods of any of embodiments 18-25.

What is claimed is:

1. A method, performed by a user equipment (UE), of associating positioning signals with beams transmitted in a wireless network comprising a location server and a base station, the method comprising:
receiving, from the location server, assistance data comprising:
a configuration of positioning signals to be transmitted by the wireless network; and
information identifying at least one relationship between:
one or more positioning beams that carry the positioning signals, and
one or more radio resource management (RRM) beams that carry RRM signals; and
receiving, from the base station, the positioning signals via the one or more positioning beams based on the at least one relationship between the one or more positioning beams and the one or more RRM beams.

2. The method of claim 1, further comprising:
based on the received configuration and the at least one relationship between the one or more positioning beams and the one or more RRM beams, determining the one or more positioning beams for receiving the positioning signals; and
receiving the positioning signals via the determined one or more positioning beams.

3. The method claim 2, wherein:
determining one or more positioning beams comprises determining one or more RRM beams that carry the positioning signals; and
receiving the positioning signals via the determined positioning beams comprises receiving the positioning signals and one or more RRM signals via the determined one or more RRM beams.

4. The method of claim 1, wherein the at least one relationship comprises a relationship between the positioning signals and one or more RRM signals carried by the RRM beams.

5. The method of claim 4, wherein:
the one or more RRM signals comprise respective synchronization signal and physical broadcast control channel blocks (SSBs); and
the at least one relationship comprises a relationship between the positioning signals and the SSBs carried by the RRM beams.

6. The method of claim 1, wherein the at least one relationship comprises a quasi-colocation (QCL) relationship between the positioning signals and the RRM signals.

7. The method of claim 1, wherein the information identifying each relationship comprises indices of one or more corresponding RRM beams.

8. The method of claim 1, further comprising receiving, from the location server, a flag indicating whether or not the one or more positioning beams are used for any other purpose than positioning.

9. The method of claim 1, wherein the assistance data is received from the location server via Long Term Evolution (LTE) Positioning Protocol (LPP) signaling.

10. The method of claim 1, wherein the configuration of the positioning signals includes one or more of the following: association with a cell in the wireless network, direction, frequency range, frequency bandwidth, time duration, and periodicity.

11. A User Equipment (UE) configured to receive positioning signals in a wireless network comprising a location server and a base station, the UE comprising:
a processor; and
a memory storing instructions that, when executed by the processor, cause the UE to perform operations corresponding to the method of claim 1.

12. A method, performed by a base station in a wireless network, of associating positioning signals with beams transmitted in the wireless network, the method comprising:
sending, to a location server in the wireless network, information identifying at least one relationship between:
one or more positioning beams that carry positioning signals to be transmitted by the wireless network, and
one or more radio resource management (RRM) beams that carry RRM signals; and
transmitting the positioning signals to one or more user equipment (UEs) operating in the wireless network.

13. The method of claim 12, further comprising determining the at least one relationship between the positioning beams and the RRM beams.

14. The method of claim 12, wherein the at least one relationship comprises a quasi-colocation (QCL) relationship between the positioning signals and the RRM signals.

15. The method of claim 12, wherein the information identifying each relationship comprises indices of one or more corresponding RRM beams.

16. The method of claim 12, further comprising transmitting the positioning signals and the RRM signals based on the at least one relationship between the positioning beams and the RRM beams.

17. The method of claim 12, further comprising sending, to the location server, a flag indicating whether the one or more positioning beams are used for any other purpose than positioning.

18. The method of claim 12, wherein the information identifying the at least one relationship is sent by the base station to the location server using NR Positioning Protocol A (NRPPa) signaling.

19. A base station configured for operation in a wireless network, the base station comprising:
network interface circuitry configured to communicate with a location server in the wireless network; and
processing circuitry operably coupled to the network interface circuitry, whereby the network interface circuitry and processing circuitry are configured to perform operations corresponding to the method of claim 12.

20. A method, performed by a location server in a wireless network, of associating positioning signals with beams transmitted in the wireless network, the method comprising:
receiving, from a base station in the wireless network, information identifying at least one relationship between:
one or more positioning beams that carry positioning signals to be transmitted by the wireless network; and
one or more radio resource management (RRM) beams that carry RRM signals; and
sending, to one or more UEs, assistance data comprising:
a configuration of the positioning signals to be transmitted by the wireless network; and
information identifying the at least one relationship between the one or more positioning beams and the one or more RRM beams.

21. The method of claim 20, wherein the configuration of the positioning signals includes one or more of the following: association with a cell in the wireless network, direction, frequency range, frequency bandwidth, time duration, and periodicity.

22. The method of claim 20, further comprising sending, to the one or more UEs, a flag indicating whether or not the one or more positioning beams are used for any other purpose than positioning.

23. The method of claim 20, wherein the assistance data is sent by the location server to the one or more UEs via Long Term Evolution (LTE) Positioning Protocol (LPP) signaling.

24. A location server configured for operation in a wireless network, the location server comprising:
- network interface circuitry configured to communicate with a base station in the wireless network; and
- processing circuitry operably coupled to the network interface circuitry, whereby the network interface circuitry and processing circuitry are configured to perform operations corresponding to the methods of claim 20.

* * * * *